United States Patent
Yonezawa

(10) Patent No.: US 8,894,014 B2
(45) Date of Patent: Nov. 25, 2014

(54) FIRING PREVENTION STRUCTURE OF FUEL TANK

(75) Inventor: Futoshi Yonezawa, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 282 days.

(21) Appl. No.: 13/203,323

(22) PCT Filed: Feb. 17, 2010

(86) PCT No.: PCT/JP2010/052384
§ 371 (c)(1),
(2), (4) Date: Aug. 25, 2011

(87) PCT Pub. No.: WO2010/098243
PCT Pub. Date: Sep. 2, 2010

(65) Prior Publication Data
US 2012/0012709 A1   Jan. 19, 2012

(30) Foreign Application Priority Data

Feb. 27, 2009   (JP) ................................ 2009-046178

(51) Int. Cl.
*B64D 37/32*   (2006.01)
*B64D 45/02*   (2006.01)

(52) U.S. Cl.
CPC ................ *B64D 37/32* (2013.01); *B64D 45/02* (2013.01)
USPC .................... 244/135 R; 244/129.2; 244/1 A; 361/215; 361/218

(58) Field of Classification Search
USPC ................ 244/1 A, 129.2, 129.1, 135 R, 131, 244/123.1, 119, 117 R; 361/218, 215
See application file for complete search history.

(56) References Cited

U.S. PATENT DOCUMENTS 4,630,789 A * 12/1986 Rosenberg ................ 244/135 R
4,654,747 A *  3/1987 Covey .......................... 361/215
(Continued)

FOREIGN PATENT DOCUMENTS

CN           101312879         11/2008
(Continued)

OTHER PUBLICATIONS

Japanese Office Action issued Oct. 4, 2012 in corresponding Japanese Patent Application No. 2009-046178 with partial English translation.
International Search Report issued Apr. 13, 2010 in International (PCT) Application No. PCT/JP2010/052384.
(Continued)

*Primary Examiner* — Tien Dinh
*Assistant Examiner* — Richard R Green
(74) *Attorney, Agent, or Firm* — Wenderoth, Lind & Ponack, LLP.

(57) ABSTRACT

A firing prevention structure of a fuel tank is provided with a double sleeve to pass through a hole formed in a rib, and a supporting structure to support a pipe to pass through the double sleeve. The supporting structure is attached to the rib. The supporting structure is provided with an insulating section which electrically insulates the pipe and the rib. The double sleeve is formed of electrically insulating material. Thus, an ignition source in the fuel tank is prevented.

13 Claims, 3 Drawing Sheets

(56) References Cited

U.S. PATENT DOCUMENTS

| | | | | |
|---|---|---|---|---|
| 4,971,268 | A | * | 11/1990 | Dobrowski et al. ........ 244/135 R |
| 4,985,801 | A | * | 1/1991 | Hellard et al. ................. 361/215 |
| 5,698,309 | A | * | 12/1997 | Dallmann et al. ............ 428/323 |
| 6,919,012 | B1 | * | 7/2005 | Bucar .......................... 205/107 |
| 2006/0099843 | A1 | * | 5/2006 | Fullner et al. ................. 439/275 |
| 2008/0013246 | A1 | | 1/2008 | Monge et al. |
| 2011/0117773 | A1 | | 5/2011 | Delmas |

FOREIGN PATENT DOCUMENTS

| | | |
|---|---|---|
| JP | 5-39918 | 2/1993 |
| JP | 5-300708 | 11/1993 |
| JP | 2005-351305 | 12/2005 |
| JP | 2007-312599 | 11/2007 |
| RU | 459942 | 5/2005 |
| WO | 2006/051229 | 5/2006 |
| WO | 2006/054572 | 5/2006 |

OTHER PUBLICATIONS

Federal Aviation Regulation Part 25 Sec. 25.981, [Online] Federal Aviation Administration. [retrieved on Oct. 27, 2008] Retrieved From the Internet: <URL:http://rgl.faa.gov/Regulatory_and_Guidance_Library/rgFAR.nsf/0/339daee3e0a6379d862574cf00641951!OpenDocument>.

Japanese Decision to Grant a Patent issued Jan. 30, 2013 in corresponding Japanese Patent Application No. 2009-046178 with English translation.

Russian Decision of Grant issued Dec. 11, 2012 in corresponding Russian Patent Application No. 2011139330 with English translation.

Chinese Office Action, with English translation, issued May 6, 2013 in corresponding Chinese Patent Application No. 201080009589.1.

Canadian Notice of Allowance issued Feb. 3, 2014 in corresponding Canadian Application No. 2,753,692.

* cited by examiner

FIRING PREVENTION STRUCTURE OF FUEL TANK

TECHNICAL FIELD

The present invention is related to a firing prevention of a fuel tank.

BACKGROUND

As disclosed in Federal Aviation Regulation Part 25 Sec. 25.981, the US Federal Aviation Administration promulgated regulation about the firing prevention of a fuel tank. According to this regulation, it is necessary to take measures so as for any ignition source not to generate in the fuel tank even in either of a case of a single failure, a case of a combination of the single trouble and a latent failed state that the relation to the single failure is not low, and a case of a combination of failures having possibilities which are not very low.

SUMMARY OF THE INVENTION

The subject matter of the present invention is to provide a firing prevention structure of a fuel tank in which it is prevented that an ignition source is generated in the fuel tank, and an aircraft using the same.

The firing prevention structure of a fuel tank in a first aspect of the present invention, is provided with a double sleeve configured to pass through a hole formed in a rib; and a supporting structure configured to support a pipe which passes through said double sleeve. The supporting structure is attached to said rib, and said supporting structure comprises an insulating section which electrically insulates said pipe and said rib from each other. The double sleeve is formed of electrically insulating material.

Therefore, even when two out of three of the inner sleeve of the double sleeve, the outer sleeve of the double sleeve, and the supporting structure are broken down, any spark discharge between the rib and the pipe is prevented by the remaining one.

Preferably, said double sleeve comprises an inner sleeve and an outer sleeve, said inner sleeve is formed of a first electrically insulating material, and said outer sleeve is formed of a second electrically insulating material which is different from said first electrically insulating material. The insulating section is formed of a third electrically insulating material which is different from said first electrically insulating material and said second electrically insulating material.

Therefore, it can be prevented that three of the inner sleeve, the outer sleeve and the supporting structure are broken down at a same time.

Preferably, said first electrically insulating material, said second electrically insulating material and said third electrically insulating material are plastic materials, respectively. The first electrically insulating material is higher in tensile strength than said second electrically insulating material, and said third electrically insulating material is higher in tensile strength than said first electrically insulating material.

Therefore, the strength of the insulating section of the supporting structure to support the pipe is the highest and the strength of the inner sleeve to support the pipe when the supporting structure is broken down becomes next high.

Preferably, the double sleeve is provided with a flange.

Therefore, any spark discharge between the pipe and the rib along the surface of the double sleeve can be surely prevented.

The aircraft in a second aspect of the present invention is provided with the above-mentioned firing prevention structure of the fuel tank.

According to the present invention, the firing prevention structure of the fuel tank and the aircraft are provided, in which it is prevented that an ignition source is generated in the fuel tank.

BRIEF DESCRIPTION OF THE DRAWINGS

The above object, other objects, effects and features of the present invention will be made clear from the description of the embodiments in conjunction with the following drawings.

DESCRIPTION OF EMBODIMENTS

Hereinafter, a firing prevention structure of a fuel tank according to the present invention will be described in detail with reference to the attached drawings.

First Embodiment

Figure 1:
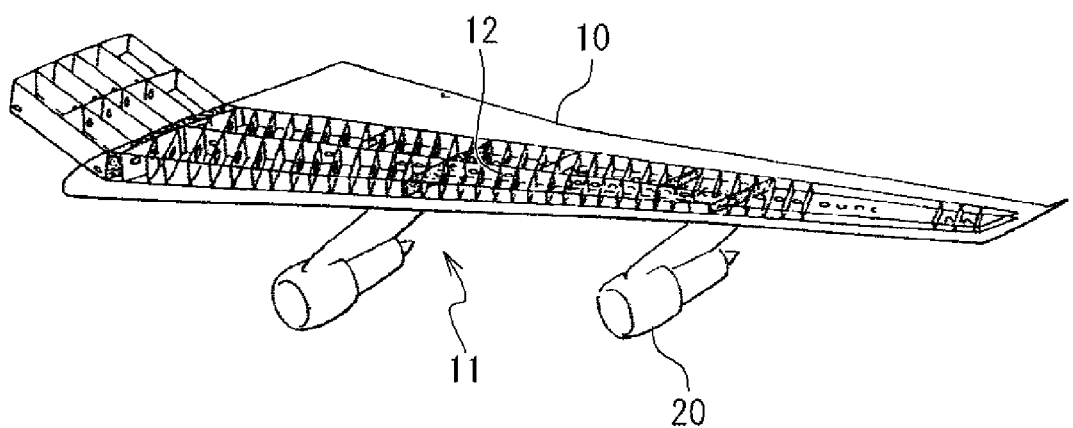
FIG. 1 shows a wing of an aircraft according to a first embodiment of the present invention.

FIG. 1 shows a wing 10 of an aircraft according to a first embodiment of the present invention. The wing 10 is provided with a fuel tank 11 and ribs 12 which are arranged in the fuel tank 11. The rib 12 is a structural member of the wing 10. The fuel tank 11 stores fuel to be supplied to engines 20.

Figure 2:
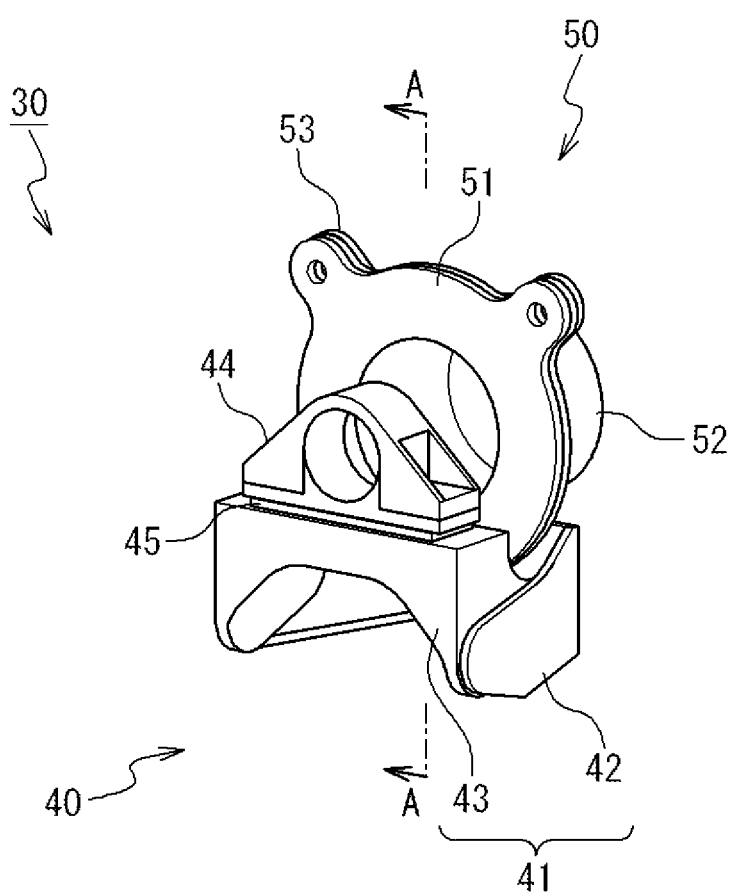
FIG. 2 is a perspective view of a firing prevention structure according to the first embodiment.

FIG. 2 shows a firing prevention structure 30 to prevent an ignition source from being generated in the fuel tank 11. The firing prevention structure 30 is provided with a supporting structure 40, a double sleeve 50 and a spacer 53. The supporting structure 40 is provided with a clamp 44, a shim 45 and a bracket 41 to support the clamp 44. The bracket 41 is provided with a first bracket section 42 and a second bracket section 43. The double sleeve 50 is provided with an inner sleeve 51 and an outer sleeve 52.

Hereinafter, the firing prevention structure 30 will be described in detail.

Figure 3:
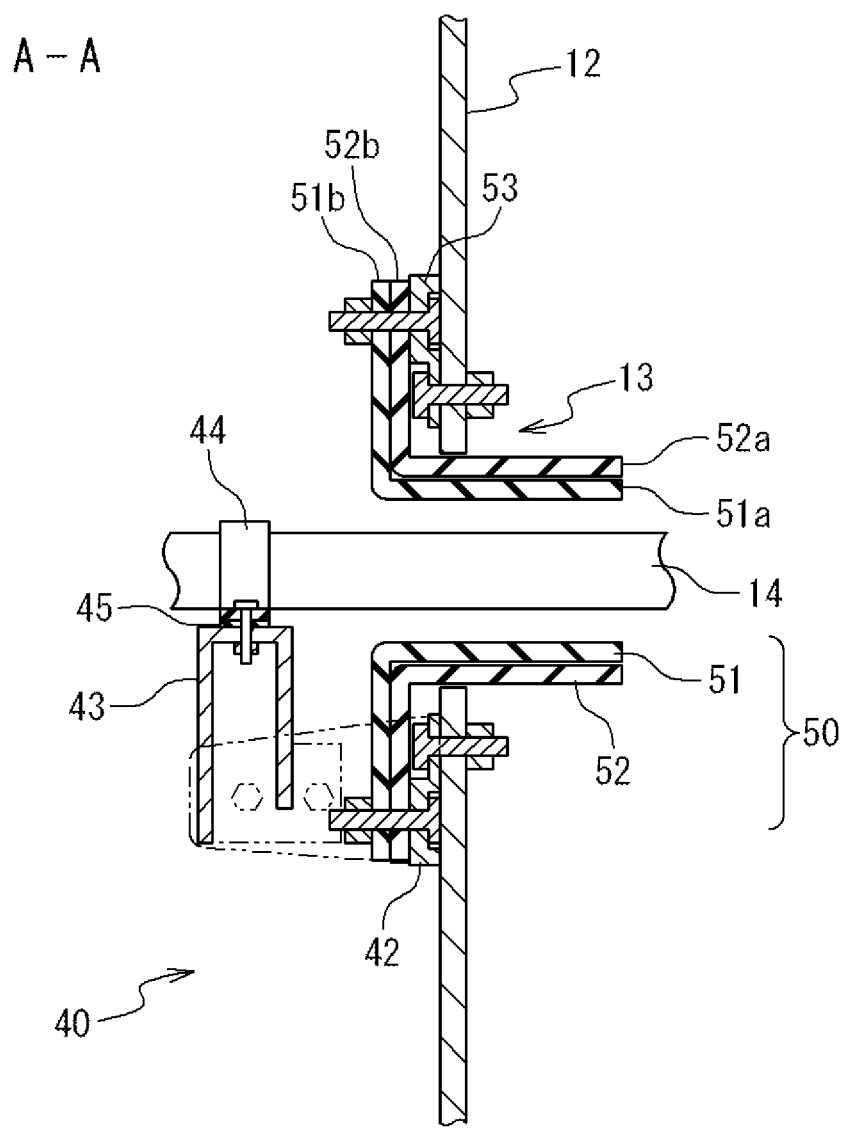
FIG. 3 is a sectional view of the firing prevention structure.

Referring to FIG. 3, a pipe 14 passes through a hole 13 formed in the rib 12. For example, the pipe 14 is a fuel line and a hydraulic line. Because the rib 12 and the pipe 14 are made of metals, it is required to prevent a spark discharge between the rib 12 and the pipe 14.

The supporting structure 40 supports the pipe 14 so as to secure a sufficient distance between the pipe 14 and the rib 12. The first bracket section 42 is formed of metal and is attached to the rib 12 with bolts and nuts. The second bracket section 43 is formed of metal and is attached to the first bracket section 42 with bolts and nuts. The clamp 44 is formed of electric insulating material such as plastic and is attached to the second bracket section 43 with bolts and nuts. The clamp 44 holds the pipe 14. The shim 45 is formed of electric insulating material such as plastic and is arranged between the clamp 44 and the second bracket section 43. The position of clamp 44 is adjusted by the shim 45 such that the pipe 14 passes through the center of the hole 13. The bracket 41 which is provided with the first bracket section 42 and the second bracket section 43 supports the clamp 44 such that the clamp 44 is arranged in a position apart from the hole 13 in a direction of extension of the pipe 14. The clamp 44 is an insulating section which electrically insulates the pipe 14 from the rib 12. It should be noted that the second bracket section 43 may be formed of electric insulating material such as plastic. In this case, the insulating section of the supporting structure 40 contains the clamp 44 and the second bracket section 43.

Because the sufficient distance is secured between the pipe 14 and the rib 12 by the supporting structure 40, a spark discharge between the rib 12 and the pipe 14 can be prevented.

The double sleeve 50 is inserted into the hole 13 and the pipe 14 passes through the double sleeve 50. The double sleeve 50 is attached to the rib 12. The inner sleeve 51 and the outer sleeve 52 are each formed of electric insulating material such as plastic. The inner sleeve 51 is provided with a tubular shape section 51a and a flange section 51b formed to the tubular section 51a. The outer sleeve 52 is provided with a tubular section 52a and a flange section 52b formed to the tubular section 52a. The tubular section 52a is inserted into the hole 13, the tubular section 51a is arranged inside the tubular section 52a and the pipe 14 passes through the tubular section 51a. The flange section 52b is arranged between the rib 12 and the flange section 51b. The spacer 53 is formed of metal and is attached to the rib 12 by bolts and nuts. The flange section 51b and the flange section 52b are attached to the spacer 53 and the first bracket section 42 by bolts and nuts.

Even when the supporting structure 40 is broken down, the sufficient distance is secured between the pipe 14 and the rib 12 by the double sleeve 50. Moreover, even when the pipe 14 touches the double sleeve 50 due to a trouble of the supporting structure 40, it can be surely prevented that a spark discharge happens between the pipe 14 and the rib 12 along the surface of the inner sleeve 51 or the outer sleeve 52, because the inner sleeve 51 is provided with the tubular section 51a and the flange section 51b, and the outer sleeve 52 is provided with the tubular section 52a and the flange section 52b.

According to the present embodiment, even when two among three of the supporting structure 40, the inner sleeve 51, and the outer sleeve 52 are broken down, the spark discharge between the rib 12 and the pipe 14 can be prevented by the remaining one.

In order to prevent that the inner sleeve 51, the outer sleeve 52 and the supporting structure 40 are all broken down at a same time, it is desirable that first electric insulating material which forms the inner sleeve 51, second electric insulating material which forms the outer sleeve 52, and third electric insulating material which forms the insulating section of the supporting structure 40 are different from each other. Thus, the inner sleeve 51, the outer sleeve 52 and the supporting structure 40 provide a redundancy to the firing prevention structure to prevent the generation of the spark discharge between the rib 12 and the pipe 14.

The highest strength is required for the insulating section of the supporting structure 40 which always supports the pipe 14. Higher strength is required for the inner sleeve 51 which the pipe 14 touches directly first when the supporting structure 40 is broken down. Therefore, when the first to third electric insulating materials are plastic, it is desirable that the tensile strength of the third electric insulating material is the highest among the first to third electric insulating materials, and the tensile strength of the first electric insulating material is next high. For example, LYTEX (registered trademark) may be used as the third electric insulating material, nylon may be used as the first electric insulating material, DELRIN (registered trademark) may be used as the second electric insulating material.

If the materials of the inner sleeve 51, the outer sleeve 52, and the insulating section of the supporting structure 40 have a large electrical resistivity, resistance of occurrence of static electricity, and a high tolerance to fuel, the materials are not limited to the above-mentioned examples.

As described above, the present invention has been described with reference to the embodiments. However, the present invention is not limited to the above embodiments. Various modifications can be carried out to the above embodiments.

This patent application claims a priority on convention based on Japanese Patent Application No. 2009-046178 filed on Feb. 27, 2009, and the disclosure thereof is incorporated herein by reference.

The invention claimed is:

1. A firing prevention structure of a fuel tank, said firing prevention structure comprising:
   a double sleeve including a sleeve section and a flange section, wherein said sleeve section is configured to pass through a hole formed in a rib, and said double sleeve is configured to be attached to the rib at said flange section; and
   a supporting structure configured to support a pipe such that the pipe passes through from said double sleeve and is spaced apart from said double sleeve, wherein said supporting structure is configured to be attached to the rib,
   wherein said supporting structure comprises a bracket and a clamp section having an insulating section, wherein said clamp section is configured to electrically insulate the pipe and the rib from each other while supporting the pipe, and
   wherein said double sleeve is formed of electrically insulating material.

2. The firing prevention structure according to claim 1, wherein said double sleeve comprises an inner sleeve and an outer sleeve,
   wherein said inner sleeve is formed of a first electrically insulating material,
   wherein said outer sleeve is formed of a second electrically insulating material which is different from said first electrically insulating material, and
   wherein said insulating section is formed of a third electrically insulating material which is different from said first electrically insulating material and said second electrically insulating material.

3. The firing prevention structure according to claim 2, wherein said first electrically insulating material, said second electrically insulating material and said third electrically insulating material are plastic materials, respectively, and
   wherein said first electrically insulating material is higher in tensile strength than said second electrically insulating material, and said third electrically insulating material is higher in tensile strength than said first electrically insulating material.

4. An aircraft having a firing prevention structure, said aircraft comprising:
   a rib having a hole;
   a double sleeve including a sleeve section and a flange section, wherein said sleeve section passes through said hole formed in said rib and said flange section is attached to said rib;
   a pipe which passes through said double sleeve;
   a supporting structure which is attached to said rib and supports said pipe such that said pipe passes through said double sleeve,
   wherein said supporting structure includes a bracket and a clamp section having an insulating section, wherein said clamp section electrically insulates said pipe and said rib from each other, and wherein said double sleeve is formed of electrically insulating material.

5. The aircraft according to claim 4, wherein said double sleeve comprises an inner sleeve and an outer sleeve,
   wherein said inner sleeve is formed of a first electrically insulating material,
   wherein said outer sleeve is formed of a second electrically insulating material which is different from said first electrically insulating material, and
   wherein said insulating section is formed of a third electrically insulating material which is different from said first electrically insulating material and said second electrically insulating material.

6. The aircraft according to claim 5, wherein said first electrically insulating material, said second electrically insulating material and said third electrically insulating material are plastic materials, respectively, and
   wherein said first electrically insulating material is higher in tensile strength than said second electrically insulating material, and said third electrically insulating material is higher in tensile strength than said first electrically insulating material.

7. An aircraft having a firing prevention structure, said aircraft comprising:
   a rib having a hole;
   a double sleeve including a sleeve section and a flange section extending radially outward from the sleeve section, wherein said sleeve section passes through said hole formed in said rib and said flange section is attached to said rib, and said double sleeve is formed of electrically insulating material;
   a pipe which passes through said double sleeve with a gap between an outer surface of said pipe and an inner surface of said sleeve section of said double sleeve;
   a supporting structure having a clamp section clamped on said pipe and a bracket attached to said rib,
   wherein said supporting structure includes a bracket and a clamp section having an insulating section,
   wherein said supporting structure extends away from said rib such that a gap is disposed between said clamp section and said rib in an axial direction of the pipe, and
   wherein said clamp section electrically insulates said pipe and said rib from each other.

8. The aircraft according to claim 7, wherein said double sleeve comprises an inner sleeve and an outer sleeve,
   wherein said inner sleeve is formed of a first electrically insulating material,
   wherein said outer sleeve is formed of a second electrically insulating material which is different from said first electrically insulating material, and
   wherein said insulating section is formed of a third electrically insulating material which is different from said first electrically insulating material and said second electrically insulating material.

9. The aircraft according to claim 8, wherein said first electrically insulating material, said second electrically insulating material and said third electrically insulating material are plastic materials, respectively, and
   wherein said first electrically insulating material is higher in tensile strength than said second electrically insulating material, and said third electrically insulating material is higher in tensile strength than said first electrically insulating material.

10. The aircraft according to claim 7, further comprising a wing, wherein the rib is a structural member disposed in the wing of the aircraft.

11. The aircraft according to claim 7, further comprising a wing, wherein the rib is a structural member disposed in the wing of the aircraft, and
    wherein the pipe is one of a fuel line and a hydraulic line, and is disposed in the wing of the aircraft.

12. The aircraft according to claim 11, wherein said double sleeve comprises an inner sleeve and an outer sleeve,
    wherein said inner sleeve is formed of a first electrically insulating material,
    wherein said outer sleeve is formed of a second electrically insulating material which is different from said first electrically insulating material, and
    wherein said insulating section is formed of a third electrically insulating material which is different from said first electrically insulating material and said second electrically insulating material.

13. The aircraft according to claim 12, wherein said first electrically insulating material, said second electrically insulating material and said third electrically insulating material are plastic materials, respectively, and
    wherein said first electrically insulating material is higher in tensile strength than said second electrically insulating material, and said third electrically insulating material is higher in tensile strength than said first electrically insulating material.

* * * * *